United States Patent [19]
Wiseman

[11] Patent Number: 4,848,954
[45] Date of Patent: Jul. 18, 1989

[54] METHOD FOR SPLICING TUBULAR FRAME MEMBERS

[75] Inventor: John A. Wiseman, Lynchburg, Va.

[73] Assignee: Simplimatic Engineering Company, Lynchburg, Va.

[21] Appl. No.: 263,828

[22] Filed: Oct. 28, 1988

[51] Int. Cl.[4] .............................. F16B 7/04; F16B 7/18
[52] U.S. Cl. ..................................... 403/312; 403/310; 403/408.1; 52/726; 29/401.1; 29/525.1
[58] Field of Search ................... 156/304.3; 248/163.1, 248/188, 188.8; 29/401.1, 526.1; 285/20, 65; 182/62.5; 403/405.1, 406.1, 408.1, 293, 295, 306, 378, 312, 313, 310, 383, 363, 379, 3, 190, 195–197, 201, 286, 394, 302; 52/726, 721

[56] References Cited

U.S. PATENT DOCUMENTS

| | | | |
|---|---|---|---|
| 1,442,582 | 1/1923 | Palmer-Jones | 403/408.1 |
| 1,710,842 | 4/1929 | Salustri | 403/312 |
| 3,415,554 | 12/1968 | Papayoti | 403/408.1 |
| 3,521,917 | 7/1970 | King | 403/406.1 |
| 3,776,549 | 12/1973 | Ganis | 403/312 |

*Primary Examiner*—Michael Wityshyn
*Attorney, Agent, or Firm*—St. Onge Steward Johnston & Reens

[57] ABSTRACT

A method is provided for forming a rigid joint between two tubular frame members positioned end to end but not necessarily in abutment, each said member having a tubular wall defined by an outer surface and an inner surface defining an interior passageway, each member being congruent with the other said member in the region of the ends to be joined, each said member having a substantially square cross section with at least one pair of diagonally opposing corners. The method comprises the step of securing one of said members to the other by passing at least a pair of elongated fastening means, one through each member, diagonally through the wall of each member at diagonally opposing corners of said member adjacent the ends to be joined. Said pair of fastening means also passes through and engages a rigid coupling disposed about the outside surface of said tubular wall in the region of said opposing corners and extends on either side of the joint for rigidly holding said members to each other in proper end to end alignment.

15 Claims, 1 Drawing Sheet

METHOD FOR SPLICING TUBULAR FRAME MEMBERS

I. FIELD OF THE INVENTION

The present invention relates to the splicing of tubular frame members. More specifically, an improved method is provided for splicing tubular frame members end to end at a joint wherein fastening means such as bolts are passed through diagonally opposing corners of each said member and also through a rigid coupling extending across said joint.

BACKGROUND OF THE INVENTION

Machine frames with square tubing are commonplace in the art, such as for example a machine supported on four legs, each leg formed from square metal tubing such as 7 gauge 2" square tubing. It is also common to modify the leg lengths in the field to change the elevation of the machine, such as for example lengthening the legs by splicing extensions thereon. In such instances, the leg extensions would preferably include additional lengths of 7 gauge 2" square tubing, which can be welded or bolted end to end on the existing legs. Where bolting is the preferred method, the bolts are typically passed through side-to-side bores in the tubing, with some type of rigid link or other coupling extending across the joint and likewise being engaged by the bolts to secure the splice.

Such a typical prior art method may result in difficulty in aligning the two lengths of square tubing being joined. The splice may be weaker than the tubing itself, the splice may have poor appearance, and the splice may be unsatisfactory because of variations in tubing sizes and squareness.

SUMMARY OF THE INVENTION

A method is provided in accordance with the present invention for forming a rigid joint between two square tubular frame members placed end to end, wherein the fastening bolts are passed diagonally through a rigid coupling surrounding the joint and diagonally opposing corners of the tubular member instead of from side to side. The rigid coupling is preferably a split coupling that includes two V-shaped bodies with apertures in the apices of the V's, the open part of each V for mating with the outside walls of the tubular members. The bolts pass through both the apertures in the V-shaped bodies and corresponding diagonally opposing holes in the members for clamping the joint between the two bodies.

Also in accordance with the preferred embodiment of the present invention, a joint is provided comprising tubular members clamped end to end between a V-shaped split coupling, with a pair of bolts passing diagonally through the corners of the combination, instead of from side to side.

It is an object of the present invention to provide a method of splicing square tubing that gives improved alignment of the two tubing lengths being joined.

It is a further object of the present invention to provide such a splicing method that results in an end to end joint with improved strength.

It is a further object of the present invention to provide such a splicing method resulting in improved appearance.

It is a further object of the present invention to provide such a splicing method that compensates for variations in tubing sizing and squareness.

Further objects and advantages of the present invention will become apparent from the following description of the drawings and the preferred embodiments

BRIEF DESCRIPTION OF THE DRAWINGS

FIG. 2 is a side view of one of the splices shown in FIG. 1; and.

DETAILED DESCRIPTION OF THE PREFERRED EMBODIMENT

Figure 1:
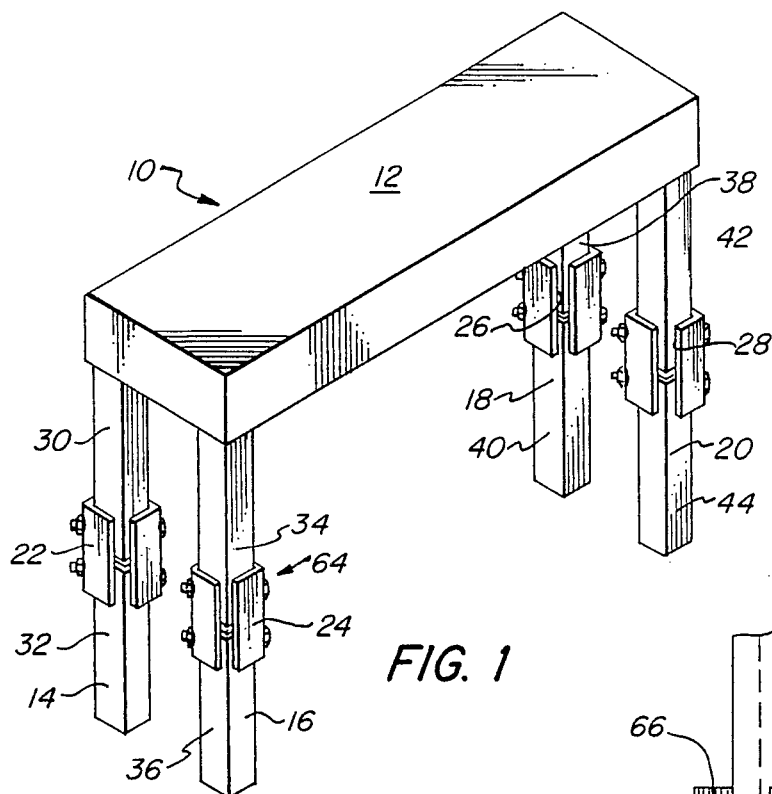
FIG. 1 is a perspective view of a representative use of the splicing method of the present invention.

With reference now to FIG. 1, a table 10 is indicated with a surface 12 supported by four legs 14, 16, 18, and 20 having four splices indicated at 22, 24, 26, and 28 joining first and second lengths 30 and 32, 34 and 36, 38 and 40, and 42 and 44 of square tubing. It is readily apparent that tubing lengths 30, 34, 38, and 42 form a set of legs of a first length, which were lengthened by splicing second lengths 32, 36, 40, and 44 onto the first lengths by the method of the present invention.

It is understood that the present invention is not in any respect limited to table 10, inasmuch as the surface 12 supported by legs 14, 16, 18, and 20 could be any suitable device or machine. Nor is the present invention limited to four spliced legs of any particular length, because multiple splices could be formed in a particular leg, or any number of legs might be used as needed. The legs of table 10 are merely illustrative of the end to end splicing technique of the present invention.

Figure 3:
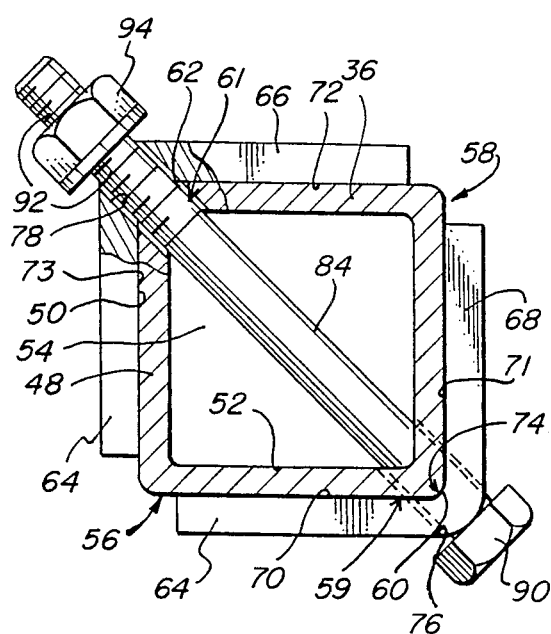
FIG. 3 is an end view with partial cross-section of one of the splices of FIG. 1.
Figure 2:
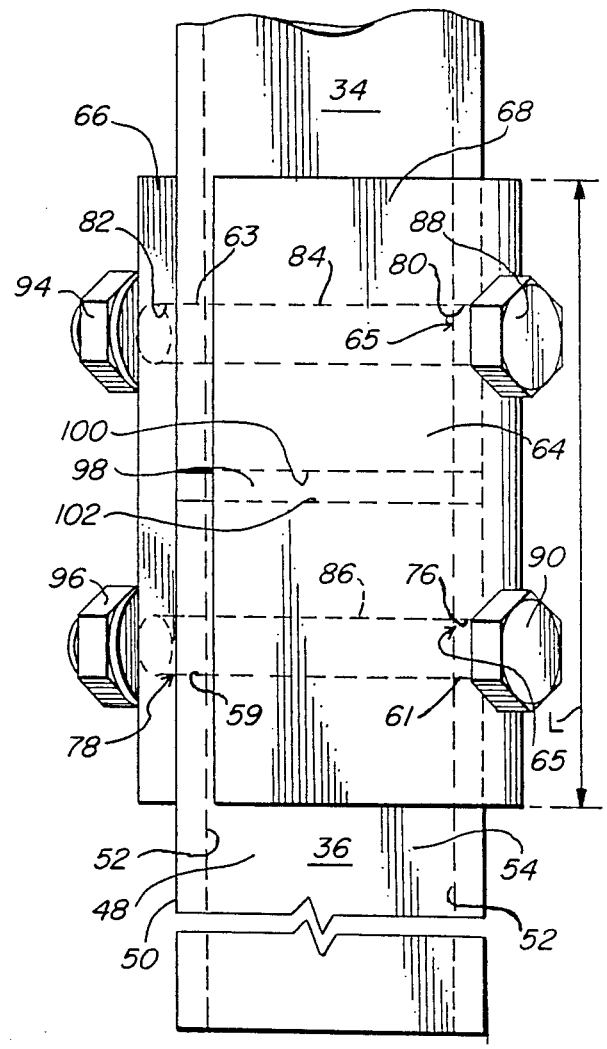

FIGS. 2 and 3 show in detail the joint of the present invention between legs 34 and 36 and illustrate the splicing method of the present invention.

With reference first to FIG. 3, a square tubular frame member, here leg 36, is shown in cross section with a tubular wall 48 defined by an outer surface 50 and an inner surface 52 defining an interior passageway 54. Leg 36 has a generally square cross section with respect to the outside surface, although the two pairs of diagonally opposing corners 56 and 58 as well as 60 and 62 are slightly rounded as is known in the art. Leg 34 is substantially congruent with leg 36.

Coupling 64 that surrounds the outside f the end to end members 34 and 36 preferably comprises two V-shaped halves 66 and 68 of angle stock, each of which has a pair of inwardly facing surfaces 70, 71, and 72, 73. The angle of the stock is substantially a right angle, such as that shown at 74 to form said V-shaped member. It is preferable that the angle is a little less than 90°, such as about 88°, so that each half pulls up tightly with the outside surfaces of the tubular members 34 and 36 when the bolts 88 and 90 are tightened. Each coupling half 66 and 68 has a pair of apertures indicated at 76, 78 and 80, 82 for receiving the shafts 84 and 86 of bolts 88 and 90, said bolts having a threaded portion such as at 92 for receiving complementary threaded nuts 94 and 96.

As seen in FIGS. 2 and 3, coupling 64 has a size sufficient to substantially surround the joint 98 formed between ends 100 and 102 of tubular members 34 and 36. Ends 100 and 102 are positioned in an end to end, but not necessarily abutting, relationship. Coupling 64 has a length L at 65 sufficient to extend across ends 100 and 102 for a distance sufficient to secure the coupling to both legs 34 and 36.

It can be seen from FIG. 3 that member 36 has diagonally aligned holes 59 and 61 formed in diagonally opposing corners 60 and 62 for receiving bolt 90. Coupling 64 also has aligned apertures 76 and 78 in one side adjacent tubular member end 102 for receiving bolt 90 and apertures 80 and 82 in the other side adjacent tubing end 100. It can be seen that bolts 88 and 90 pass diagonally through opposing corners of both halves of coupling 64 with tubular members 34 and 36 held end to end therebetween to clamp ends 100 and 102 in alignment. Since coupling 64 is rigid, the legs 34 and 36 are held securely therebetween.

It is understood that additional fastening means could also be used, so long as such members passed through the tubing diagonally from opposing corner to opposing corner.

Also, by further reference to FIGS. 2 and 3 a method for forming a rigid splice 24 between two tubular frame members 34 and 36 positioned end to end but not necessarily in abutment is shown. Each member 34 and 36 is congruent with the other said member in the region of the ends 100 and 102 to be joined. The method comprises the step of securing one of said members 34 to the other member 36 by passing at least a pair of elongated fastening means such as bolts 88 and 90, one through each member, diagonally through the wall of each member at diagonally opposing corners such as 60 and 62 adjacent the ends 100 and 102 to be joined. The ends can be rotatably adjusted so that the diagonal holes and bores point in the same direction for receiving a rigid coupling about the joint. The pair of fastening means 88 and 90 also pass through and engage a rigid coupling 64 disposed substantially around the outside surface 50 of the tubular wall 48 in the region of the diagonally opposing corners such as 60 and 62 and extends on either side of the splice 24 for rigidly holding said members 34 and 36 to each other in proper end to end alignment Each said fastening means 88 and 90 passes through a pair of holes 59, 61 and 63, 65 formed in the wall of each member, each hole pair for each member being formed with one hole in each diagonal opposing corner and being in diagonal alignment with the corresponding hole for receiving the fastening means.

Each fastening means also passes through two pairs of matching apertures 76, 78 and 80, 82 in said coupling.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. A method for forming a rigid joint between the ends of two tubular frame members positioned end to end but not necessarily in abutment, each said member having a tubular wall defined by an outer surface and an inner surface defining an interior passageway, each member being congruent with the other said member in the region of the ends to be joined, each said member having a substantially square cross section with at least one pair of diagonally opposing corners, the method comprising the step of securing one of said members to the other by passing at least a pair of elongated fastening means, one through each member, diagonally through the wall of each member at diagonally opposing corners of said member adjacent the ends to be joined, said pair of fastening means also passing through and engaging a rigid coupling disposed about the outside surface of said tubular wall in the region of said opposing corners and extending on either side of the joint for rigidly holding said members to each other in proper end to end alignment.

2. The method of claim 1, further comprising the step of passing each said fastening means through a pair of holes formed in the wall of each member, each hole pair for each member being formed with one hole in each opposing corner and being in diagonal alignment with the other hole for receiving therethrough said fastening means.

3. The method of claim 2, further comprising the step of passing each fastening means through a respective pair of apertures in said coupling, said coupling having a cross-section corresponding to at least a portion of the outside walls of said members, said coupling having at least a pair of inwardly facing, generally V-shaped surfaces having apices for mating with said outside surfaces of said members in the region of said opposing corners, said apertures passing through said apices for alignment with said hole pairs in corresponding members.

4. The method of claim 3, wherein said coupling is a split coupling having first and second substantially V-shaped components, an open part of each said V for mating in abutment with said outside diagonal corners.

5. The method of claim 4, wherein said fastening means comprise bolts extending diagonally across and through said tubular members.

6. The method of claim 5, wherein each tubular member comprises a predetermined length of square tubing.

7. A method for splicing two tubular frame members end to end, each said member being substantially congruent with the other said member at the ends to be joined, each said member having a generally square cross section with at least one pair of diagonally opposing corners, the method comprising the steps of inserting at least two fastening means through both a coupling means and diagonally through said members for rigidly fastening said coupling means together with the members clamped end to end therebetween to force said coupling means inwardly along a plane aligned through opposing diagonal corners of both said members.

8. The method of claim 7, further comprising the steps of positioning said ends face to face with each other in relatively close, but not necessarily abutting, placement for forming a joint therebetween, each said frame member forming adjacent its respective end at least one hole extending diagonally through each said member at diagonally opposing corners of said member and rotatably adjusting said ends so that the diagonal bores through each end are aligned for cooperatively receiving said coupling about said joint.

9. The method of claim 8, further including the step of positioning two substantially V-shaped bodies in mating alignment on either side of said members to substantially surround said members and extend on either side of said joint to form a coupling with said tubular members at said joint held therebetween, said two bodies having apices corresponding to opposing outside diagonal corners of said members having bores therethrough, each said body further forming at least two holes through its apex for aligning with said bores, one of said holes of each body being aligned with one said bore in one said member and the other of said holes being aligned with the other said bore in the other said member.

10. A spliced joint between the ends of two tubular frame members positioned end to end but not necessarily in abutment, each said member having a tubular wall defined by an outer surface and an inner surface defining an interior passageway, each member being congruent with the other said member in the region of the ends to be joined, each said member having a generally square cross section with at least one pair of diagonally opposing corners, the joint comprising:
 (a) at least a pair of elongated fastening means, one through each member, diagonally through the wall of each member at diagonally opposing corners of said member adjacent the ends to be joined; and
 (b) a rigid coupling disposed about the outside surface of said tubular wall in the region of said opposing corners and extending on either side of the joint for rigidly holding said members to each other in proper end to end alignment, said pair of fastening means also passing through and engaging said coupling.

11. The joint of claim 10, further comprising a pair of holes formed in the wall of each member through which each said fastening means passes, each hole pair for each member being formed with one hole in each opposing corner and being in diagonal alignment with the other hole for receiving therethrough said fastening means.

12. The joint of claim 11, further comprising two pairs of apertures formed in said coupling, said coupling having a cross-section corresponding to at least a portion of the outside walls of said members, said coupling having at least a pair of inwardly facing, generally V-shaped surfaces having apices for mating with said outside surfaces of said members in the region of said opposing corners, said apertures formed through said apices for alignment with said hole pairs in corresponding members.

13. The method of claim 12, wherein said coupling comprises a split coupling having first and second substantially V-shaped components, wherein an open part of each said V is for mating with said outside diagonal corners.

14. The joint of claim 13, wherein said fastening means comprise bolts extending diagonally across and through said tubular members.

15. The joint of claim 13, wherein said tubular members comprise square tubing.

* * * * *